United States Patent

[11] 3,604,804

| [72] | Inventors | Carl M. Penney<br>Scotia;<br>Henry Hurwitz, Jr., Schenectady, both of, N.Y. |
|---|---|---|
| [21] | Appl. No. | 787,519 |
| [22] | Filed | Dec. 27, 1968 |
| [45] | Patented | Sept. 14, 1971 |
| [73] | Assignee | General Electric Company |

[54] NONCONTACTING MOTION SENSOR
7 Claims, 5 Drawing Figs.

| [52] | U.S. Cl. | 356/28 |
| [51] | Int. Cl. | G01p 3/36 |
| [50] | Field of Search | 356/28; 343/8 |

[56] References Cited
UNITED STATES PATENTS

| 3,045,232 | 7/1962 | Mercer et al. | 343/8 |
| 3,413,850 | 12/1968 | Merrifield | 356/28 |
| 3,432,237 | 3/1969 | Flower et al. | 356/28 |
| 3,446,558 | 5/1969 | Seaton | 356/28 X |

*Primary Examiner*—Malcolm F. Hubler
*Attorneys*—Richard R. Brainard, Paul A. Frank, John F. Ahern, Frank L. Neuhauser, Oscar B. Waddell, Melvin M. Goldenberg and Arnold E. Renner ABSTRACT: The motion of a moving surface is measured without making mechanical contact therewith by measurement of the difference between the Doppler shifts of different components of radiation scattered from a portion of the surface. In one specific embodiment of the invention, two coherent beams of light derived from a single laser are directed so as to be incident upon the same surface portion of a moving object from different directions, and light scattered from both of the incident beams by the surface is observed by a light detector. The detector yields a signal which oscillates at a frequency equal to the difference between the two Doppler shifts. This difference frequency is independent of scattering direction and is directly proportional to the component of the velocity of the illuminated surface in a direction determined solely by the orientation of the two incident beams.

Inventors:
Carl M. Penney,
Henry Hurwitz Jr.,
by John F. Ahern
Their Attorney.

NONCONTACTING MOTION SENSOR

BACKGROUND OF THE INVENTION

The present invention relates to methods and apparatus for measuring, without contact, the motion of a surface. More particularly, the invention relates to a sensing apparatus and method for measuring a component of velocity of a portion of a moving surface, utilizing the difference in Doppler shifts exhibited by electromagnetic acoustic waves scattered through different angles from that surface portion.

Noncontacting velocity sensors are desirable in situations where contacting sensors may slip on a surface; where they may distort or damage the surface; whenever the motion is sufficiently violent so that contact is impossible to maintain; or, as in steel rolling mills, wherever there is a possibility that nearby instrumentation could be destroyed by some unexpected, but not infrequent incident.

To overcome these and other problems, noncontacting sensors have been developed. Several recently developed noncontacting sensors involve the projection of a beam of light toward a moving surface, the detection of a component of the beam reflected, scattered, or otherwise modified by the moving surface, and the analysis of the effect of the surface motion upon the detected component of the beam.

One such method referred to hereinafter as the Moving Pattern Method, utilizes a beam of coherent light from a laser. Such a beam, when scattered from an unpolished surface, forms, at an observation screen, a granular pattern that appears to move at a rate that is related to the velocity of the moving, unpolished surface. The motion of the pattern may be measured by passing it through a grating made up of alternating opaque and transparent parallel stripes arranged perpendicularly to the direction of motion of the pattern. The light transmitted through the grating oscillates at a frequency which is proportional to the rate of pattern motion. This frequency may be measured using a light detector and suitable electronics. The corresponding surface velocity component may then be calculated provided that the situation is sufficiently well controlled so that the relationship between surface and pattern motion is known.

Although this Moving Pattern Method avoids the problems of contacting sensors and provides among other things a convenient measure of velocity components parallel to an observed flat surface that is maintained in constant orientation, it suffers from a disadvantage arising from the fact that the relationship between surface and pattern motion is sensitive to any changing orientation of the surface. Sagging, buckling or vibration of a strip will cause the orientation of area elements on its surface to change in time. As a result, errors are introduced in a Moving Pattern-velocity measurement which are proportional, in the first order, to the product of the rate of change of orientation, and the distance between the illuminated spot on the surface and the grating. Such first order sources of error can be highly undesirable in situations where precise measurements are required.

Another existing method for determining surface velocity, referred to hereinafter as the Direct Doppler Method, involves the measurement of the frequency shift, commonly known as a Doppler shift, exhibited by a beam of light after it is scattered from a moving object. The magnitude of this shift is proportional to a velocity component of the surface from which the radiation is scattered. The shift may be determined by causing the scattered light to heterodyne, or beat, with unshifted radiation from the same source. The extreme monochromaticity and directivity of light from certain gas lasers, for example the helium-neon laser, greatly facilitates optical heterodyne detection. A physical arrangement involving a laser source which accomplishes this purpose may include a laser, a beam splitter, means for directing a first portion of the split beam toward a moving surface, and means for directing a second portion towards a light detector. Scattered light from the moving surface is also directed into the light detector. The two portions will heterodyne at the detector, resulting in the production of a signal that oscillates at a frequency equal to the difference between the frequencies of the two beams, that is, to the Doppler shift in frequency. A disadvantage of this method is that efficient heterodyning, that is, the production of a strong signal at the difference frequency, is obtained only if wave fronts of the two beams have nearly the same curvature and are aligned to within an angle which is given in radians by the ratio $\lambda/D$, where $\lambda$ is the radiation wave length and D is a dimension of the light sensing surface. Typically, the alignment must be to better than one arc minute when visible light is used.

One of the characteristics of the Direct Doppler Method when applied to measurements of velocity components of flat surface in directions parallel to that surface is that in any convenient arrangement the frequency shift is relatively sensitive to motion perpendicular to the observed surface. This is a disadvantage in situations where one desires to measure a component of velocity parallel to the surface since, for example, sagging, buckling, or vibration of a moving strip will cause motion perpendicular to its surface and thereby introduce errors into the measurement of the desired velocity component. The errors are roughly proportional in first order to the angle of deviation of the velocity from the direction of anticipated motion. As mentioned previously, such first order sources of error are highly undesirable whenever precise measurements are desired.

To minimize such errors, scattered radiation may be observed along a line at a large angle to the direction of specular reflection. For many surfaces, however, most of the scattered radiation is concentrated near the specular direction, so that the use of scattered radiation in directions far removed from the specular direction involves a sacrifice of signal strength and a consequent decrease in the signal-to-noise ratio.

Accordingly, an object of the present invention is to provide a noncontacting means, wherein a velocity component of a surface, in a direction tangent at the point of observation to that surface can be measured accurately, avoiding difficult-to-control first order sources of error.

Still another object of the present invention is to provide noncontacting sensing means for the measurement of the velocity component of a moving surface in any predetermined direction which is capable of providing high accuracy and a strong signal without requiring extremely precise adjustment.

Yet another object of the present invention is to provide sensing means and methods of measuring the velocity of a moving body wherein coherent visible light is utilized and the radiation scattered from a pair of incident beams provides an indication of the velocity component in the desired direction.

Briefly stated, in accord with one embodiment of the present invention, the noncontacting velocity-measuring apparatus includes a generator of radiant energy, such as a laser device, and a means for splitting the generated beam of radiation into two separate component beams. These component beams are directed so as to approach the moving surface from different angles, intersecting at the surface. Radiation scattered by the surface from one incident component beam into any particular direction then undergoes a different Doppler shift than radiation scattered from the other incident beam into the same direction because of the angle dependence of the Doppler effect. Scattered radiation at the two different frequencies is allowed to fall upon a common light detector, where the heterodyne effect produces a signal at a frequency equal to the difference between the two Doppler shifts is independent of the direction of observed scattering, and that it is related to, and provides an accurate indication of, the component of the velocity of the observed surface portion in the direction perpendicular to the bisector of the angle formed by the two incident beams, and parallel to the plane defined by them.

DESCRIPTION OF THE DRAWING

The novel features believed characteristic of the present invention are set forth in the appended claims. The invention itself, together with further objects and advantages thereof, may best be understood with reference to the following detailed description, taken in connection with the appended drawings, in which.

DETAILED DESCRIPTION OF THE INVENTION

As is mentioned hereinbefore, a need exists for accurate, sensitive, noncontacting sensors to measure a specified velocity component of a moving surface portion in a direction which is parallel to that surface portion. Similar needs also arise in applications such as the measurement of rate of change of velocity to determine acceleration, measurement of vibration, the intergration of a velocity component over time to measure length, and the measurement of angular velocity. Another area of application of such sensors is in the measurement of fluid velocity and turbulence characteristics, in which light scattered from particles in the fluid is utilized.

Figure 1:
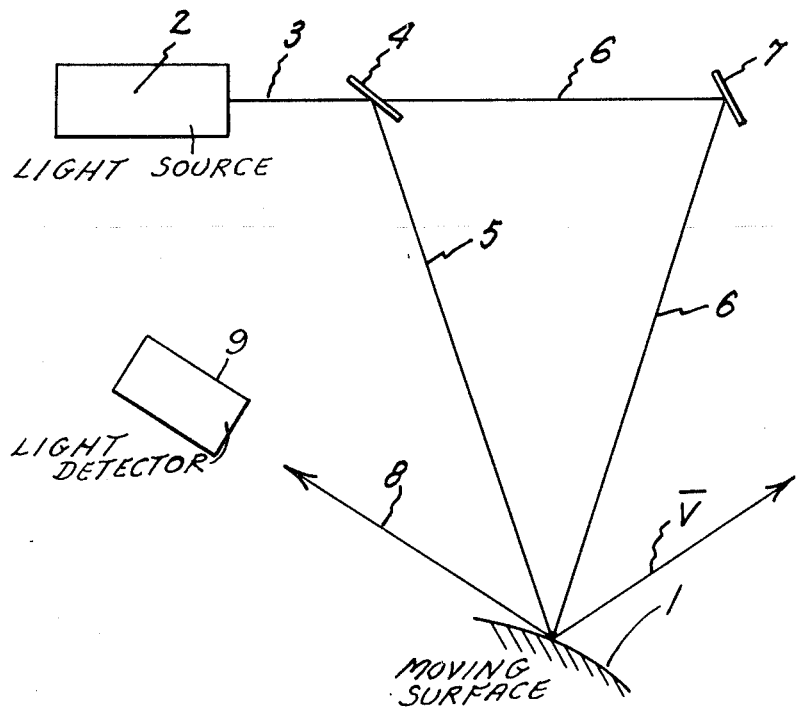
FIG. 1 illustrates a schematic optical diagram of a generalized system for measuring a velocity component of a moving surface portion in accord with the present invention, FIG. 2 indicates the vector quantities involved in the velocity measurement system illustrated in FIG. 1.
Figure 2:
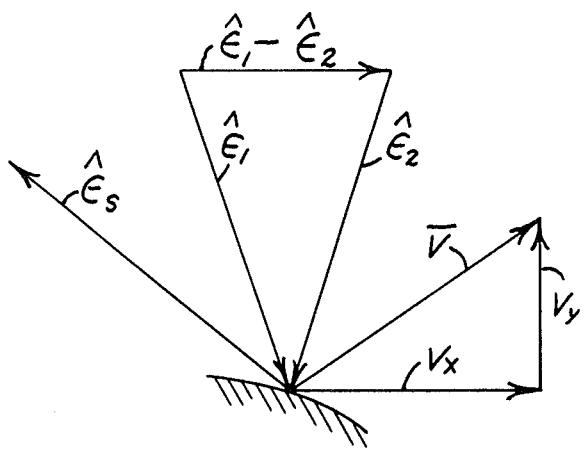

A generalized description of the system of the present invention as employed for the measurement of a component of velocity of a surface portion of an object may be explained with reference to FIG. 1. In FIG. 1, a surface portion 1 of an object is moving in a direction identified by the vector quantity $\vec{V}$ which may be considered as the sum of the vectors, $\vec{V_x}, \vec{V_y}$, as indicated in FIG. 2. In FIG. 2, the z-direction is chosen to be parallel to the bisector of the angle of $\hat{e}_1$ and $\hat{e}_2$ and the x-direction is chosen to be perpendicular to the bisector and parallel to the plane defied by $\hat{e}_1$ and $\hat{e}_2$. The y-direction is chosen to be perpendicular to the x-direction. FIG. 2 illustrates a two dimensional vector diagram. It is apparent that $\vec{V}$ may have a component in a third direction, the z-direction, which is orthogonal to the x- and y-directions, but is omitted for ease of description.

A source of light as, for example, a gas laser 2 emits a beam 3 which is incident upon a partially transmissive, partially reflecting beam splitter 4, which divides the beam into a first component beam 5 directed to and incident upon a given surface portion 1 and a second component beam 6 which is direct to, and incident upon, a reflector 7 from which it is incident upon the same surface portion 1 as is beam 5. Beams 5 and 6 are stationary in the frame of reference from which the surface motion is to be measured.

Components of the light of beams 5 and 6 are scattered in the direction represented by arrow 8 (among other directions) and are incident upon a light detector 9. The scattered components of each of the incident beams 5 and 6 undergo a Doppler shift due to the motion of a surface portion of object 1. However, because the angles of scatter from the two beams in any direction are different, the Doppler shifts will, in general, be different. In vector notation, the Doppler shift exhibited by the scattering of beam 5 in the direction 8 is given, in units of frequency, by the expression $\frac{1}{\lambda}(\hat{e}_s - \hat{e}_1) \cdot \vec{V}$, where:

$\lambda$ is the wavelength of light emitted by radiation source 2, $\hat{e}_1$ is a unit vector in the direction of propagation of the beam 5, $\hat{e}_s$ is a unit vector in the direction 8 of propagation of a component of the scattered radiation, and $(\hat{e}_s - \hat{e}_1) \cdot \vec{V}$ is the scalar product of the two vectors $(\hat{e}_s - \hat{e}_1)$ and $\vec{V}$, which is equal to the magnitude of the first vector multiplied by the component of the second in the direction of the first.

Similarly, the Doppler shift of the radiation scattered by the surface from beam 6 is equal to $\frac{1}{\lambda}(\hat{e}_1 - \hat{e}_2) \cdot \vec{V}$, where $e_2$ is a unit vector is the direction of propagation of the beam 6. By subtraction of the two expressions above, the difference in frequency between the Doppler shifts of the first and second scattered components of radiation is given by $1/\lambda (e_1 - e_2) \cdot V$. The construction in FIG. 2 illustrates that the vector $(\hat{e}_1 - \hat{e}_2)$, lies in a direction that is perpendicular to the bisector of the angle between the propagation vectors $\hat{e}_1$ and $\hat{e}_2$ of the two incident beams (beams 5 and 6 in FIG. 1) and parallel to the plane defined by these propagation vectors. Accordingly, the difference frequency is proportional to the velocity component in the x-direction, which is designated by $\vec{V}_x$ in FIG. 2.

As a result of the heterodyne effect, the signal from detector 9 will contain a component which takes the form of a sine wave that oscillates at the difference frequency but is modulated in amplitude and phase. The average amplitude of this component can be maximized by focusing beams 5 and 6 to cause the portions of the surface which they illuminate to have the smallest cross sections consistent with the condition that these portions overlap substantially at the surface. However, undue shortening of the dimension of the illuminated surface portions in the direction of surface motion will cause the severity of amplitude and phase modulation to increase, thereby broadening the frequency distribution of the signal component which corresponds to a particular surface velocity. One consequence of this broadening is that precise determination of the difference frequency, and therefrom the velocity component of interest, is made more difficult. Therefore in certain application, in order to optimize the heterodyne signal, it is advisable to use incident beams that, ideally, have a rectangular cross section, such that the illuminated portion of the surface will also have a rectangular cross section with the longer dimension in the direction of surface motion. Approximately rectangular cross section beams can be obtained from the usual circular cross section output beam of a laser through the use of cylindrical lenses.

In practice, satisfactory heterodyne signals have been obtained from white paper and shiny metal surfaces using beams of circular cross section with diameters of one to two millimeters at working distances up to several meters.

The polarizations of the beams can be an important factor. Since the heterodyne signal strength is greatest when the reflected portions of beams 5 and 6 (from smooth surfaces) are similarly polarized, all measures known to those skilled in the art should be utilized to achieve this objective.

Because of the overlap of beams 5 and 6 at the moving surface, the light wave fronts at the two different frequencies radiate from common source points and therefore are automatically sufficiently well aligned to yield a strong heterodyne signal oscillating at the difference frequency. Thus, the difficult alignment criterion of the Direct Doppler Method using optical radiation is replaced by the criterion that the two incident beams each typically several millimeters in diameter, overlap at least partially at the working distance, typically several meters. This alignment criterion is much less severe than that typical of the optical Direct Doppler Method. It is also more convenient because direct visual inspection of the illumination pattern on the moving surface can be used to adjust alignment.

The condition that the two incident beams 5 and 6 overlap substantially the moving surface ensures optimum alignment of the scattered light at the two different frequencies. However, it is possible that in certain instances a strong heterodyne signal will be obtained, even if the two beams do not overlap substantially at the surface, because of the small but finite misalignment tolerance of the heterodyne effect, mentioned hereinbefore. Therefore, the overlap condition should be regarded as optimum but not always necessary.

The expression for the difference frequency, $1(e_1-e_2)\cdot \overline{V}$, establishes that this frequency is independent of the direction from which the scattered light is observed. Therefore, the detector may be placed in the position of greatest convenience, for example, at the point of greatest scattered light intensity, and the light scattered over a large solid angle may be collected without broadening the frequency distribution of the detector signal corresponding to a particular velocity. The foregoing analysis is equally valid for a planar or curved surface portion.

Figure 3:
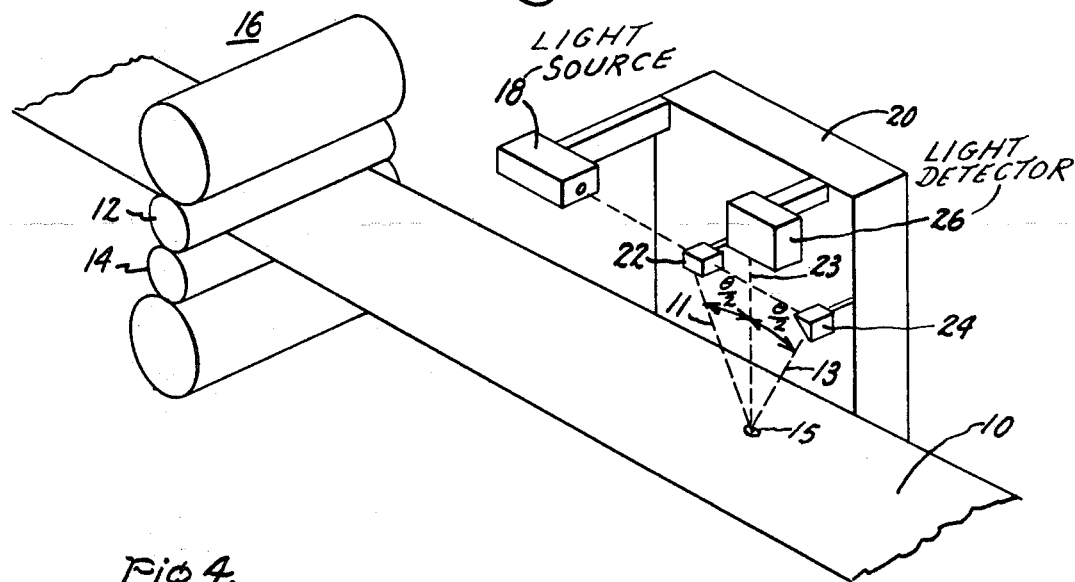
FIG. 3 illustrates a simplified embodiment of a sensor constructed in accord with the present invention, utilized to measure the rate at which a moving strip is emerging from a mill stand.

The description above, together with the relationship of the components illustrated in FIG. 1, is a generalized description of the application of the present invention to the measurement of selected velocity components of a moving surface. A particular embodiment of the invention can be applied to measure a velocity component of a moving strip parallel to its "average plane." For purposes of illustration, we regard the observed surface of the strip as being nominally flat and designate by "average plane" a plane lying in the surface and ignores microscopic surface irregularities. Likewise, the "average plane" ignores sags, buckles, or other nonsignificant departures from flatness. In measurement of a component of velocity of a curved surface, the "average plane" would be a plane tangent to the surface at the observed surface portion. Such an embodiment of a moving strip measurement is illustrated in FIG. 3. In FIG. 3, the rate at which a strip 10 is emerging from between work rolls 12 and 14 of a mill stand 16 is measured by a sensor including a radiation source 18 mounted above the strip of 10 in a suitable structural support 20. In a preferred embodiment, the radiation source 18 might be a gas laser device of the helium-neon type.

The beam of light emitted by the laser 18 is directed to a partially reflecting mirror 22 which splits the beam into two components beams. A first component beam 11, is reflected to the portion 15 of the moving surface. The second component beam 13 is transmitted to the totally reflecting mirror 24, from whence it is also directed to surface portion 15. The sensor also includes a light detector 26 which observes the light scattered from the surface portion 15. The detector may conveniently, although not necessarily, be located on the bisector 23.

In the preferred embodiment illustrated in FIG. 3, the mirrors are positioned so that the bisector of the propagation directions of the two incident beams 11 and 13 is perpendicular to the average plane of the observed surface and so that the direction of intended motion of the strip lies in the plane defined by the aforementioned propagation directions. From the foregoing discussion and the consideration of FIG. 3, it is evident that in this embodiment the signal frequencies in the arrangement are sensitive only to the velocity component in the direction of intended motion of the strip. Therefore, the often-enhanced scattered light from the near-specular direction may be observed, providing the advantage of a stronger signal, without the disadvantage of extreme sensitivity to the velocity component perpendicular to the surface which is encountered with the Direct Doppler Method, described hereinbefore. Furthermore, the equation for the signal velocity can be used to show that the error introduced by slight misalignment of the bisector of the incident beams with the normal to the surface is proportional to the square of the angle of misalignment and is, therefore, typically much smaller than the first order error produced by a similar misalignment in the Direct Doppler Method. The error produced by uncontrolled surface curvature which might arise from buckling or sagging of the strip is, similarly, of second order and typically much smaller than the corresponding errors introduced in the Moving Pattern Method and the Direct Doppler Method, described hereinbefore.

The expression for the difference frequency may be expressed in trigonometric form to show that the frequency difference is equal to the expression $2Vx/\lambda \sin \theta/2$, which is approximately equal to $\theta Vx \ 1\lambda$ for small values of $\theta$, where $\theta$ is the angle between the two incident beams 11 and 13. Here $V_x$ is the velocity component perpendicular to the bisector of, and in the plane defined by the propagation vectors of the incident beams. In the embodiment illustrated in FIG. 3, $V_x$ represents the strip speed. Since the angle $\theta$ and the wavelength $\lambda$ are predetermined, known quantities, and the difference frequency is measurable by conventional techniques, the speed $V_x$ of the strip 10 is determinable.

Figure 4:
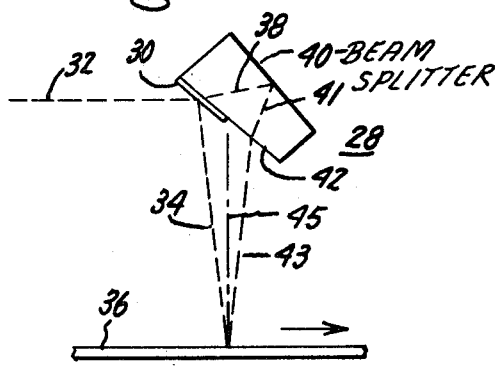
FIG. 4 shows a component of the system of FIG. 3 which may be used in alternative embodiment of the invention.

To improve the stability of the apparatus, it may be desirable to replace the individual mirrors 22 and 24 with a single optical wedge such as the type shown in FIG. 4. The optical wedge 28 disclosed therein includes a partially reflecting surface 30 and a totally reflecting surface 40. A radiation beam 32 impinging upon partially reflecting surface 30 is split into first reflected portion 34 and second transmitted portion 38. The second transmitted portion 38 is reflected from the surface 40 along the line 41 to a front surface of the wedge, where it is refracted along a line 43 toward a moving surface 36. A radiation detector, not shown, is located so as to collect light scattered from the rays 34 and 43.

Figure 5:
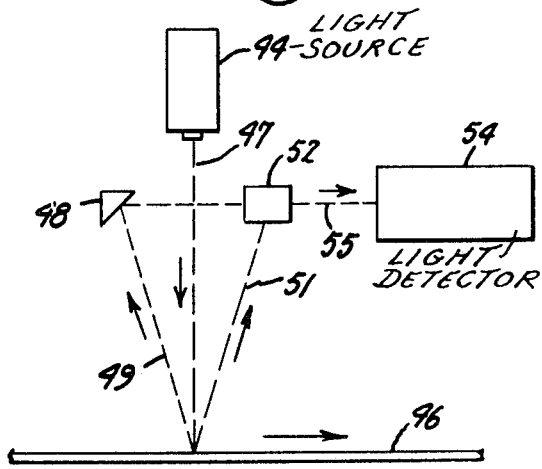
FIG. 5 shows another embodiment of the present invention.

FIG. 5 illustrates another embodiment of the present invention that may be employed to measure velocity components of a moving object. In this embodiment, a single beam of radiation 44 is directed toward the moving object. A component 49 of radiation scattered from the object is reflected by the mirror 48 toward a detector 54. A second scattered component 51 is combined with the component 49 at a partially reflecting mirror 52. The Doppler shift introduced into one component of the scattered radiation will be, in general, different from that introduced into the second component, because the two components are scattered into different directions. The vector equation for the Doppler shift discussed hereinbefore may be used to show that in the embodiment illustrated in FIG. 5, the difference in frequency between the Doppler shifts of first and second scattered components is given by $\frac{1}{\lambda}(\hat{e}_{s1}-\hat{e}_{s2}\cdot \overline{V},)$ where $\hat{e}_{s1}$ is a unit vector in the direction of propagation of the first scattered component, $\hat{e}_{s2}$ is a unit vector in the direction of propagation of the second scattered component and $\lambda$ and $\overline{V}$ are as defined hereinbefore. An observable signal at this difference frequency is furnished by the detector 54 provided the two components are sufficiently well aligned to heterodyne efficiently.

A vector construction similar to that shown in FIG. 2 reveals that the difference frequency in the embodiment illustrated in FIG. 5 is proportional to the velocity component perpendicular to the bisector of the angle formed by the directions of propagation of the observed scattered components, and parallel to the plane they define.

Although the above-described embodiments include a source of optical radiation, with optical beam directing means and optical detectors, it should be apparent that other types of radiation sources may be used with the appropriate beam directing means and appropriate detectors. For example, rather than electromagnetic radiation, such as the described coherent light radiation, as well as microwave radiation or infrared radiation, the invention may also utilize nonelectromagnetic radiation as, for example, acoustic radiation.

Similarly, it should be realized that, although the invention has been described with respect to a moving object observed from a stationary station, the invention is applicable in general to measurements of ground speed from a moving vehicle. Furthermore, it is not necessary that the observed objects have extended surfaces. For example, in yet another embodiment of the invention, the rate of flow of a moving stream of fluid may be measured by utilizing radiation scattered from individual microscopic particles in the fluid.

The invention may also be used to analyze the rapidly varying velocity components associated with vibration. From these measurements other characteristics of the vibration may be determined. Furthermore, acceleration and length of displacement may be measured by electronic differentiation or integration of the velocity signal.

Although the invention described herein most particularly with respect to measuring a velocity component in a direction tangent to an observed surface at the point of irradiation, it is apparent from the generalized discussion that such a measurement is only optimized and, as is illustrated in FIG. 1, the measurement need not be taken along such a line, As a matter of fact, the incident beams may be so that their bisector is nearly tangent to the surface at the point of irradiation. In this case the component of velocity sensed will be essentially normal to the observed surface.

From the above, it is apparent that although the invention has been described hereinbefore with respect to certain specific embodiments and preferred illustrations, it is evident that many modifications and changes may be made without departing from the spirit of the invention. Accordingly, by the appended claims, we intend to cover all such modifications and changes as fall within the true spirit and scope of this invention.

We claim:

1. In a strip-processing mill, a device for measuring the velocity component in a given direction of a moving strip including:
    a. a laser device for generating a beam of coherent light;
    b. beam directing means including $b_1$ a partially reflecting means for directing a first component of the generated light beam toward the strip surface and for transmitting a second component thereof and
    $b_2$. a totally reflecting surface for directing the second component of the generated light beam toward the strip surface; and
    c. a light detector for obtaining a signal which oscillates at a frequency equal to the difference in Doppler shifts imparted to the light scattered from the first and second component beams by said surface.

2. In a strip processing mill, a device for measuring the velocity of the moving strip as recited in claim 1, wherein said light detector is positioned along the normal to the average plane of strip surface.

3. In a strip-processing mill, a device for measuring the velocity of a moving strip as recited in claim 1, wherein said partially reflecting and said totally reflecting means are positioned to cause said component beams to lie in a plane intersecting the plane of said strip in a line parallel to the direction of movement of said strip.

4. Apparatus for measuring a component of velocity is a predetermined direction of a moving surface and comprising means for generating a laser beam, means for separating said beam into two components and for directing each said component upon a common area of said surface including a partially reflecting means for one said component and a totally reflecting means for the other of said components, and sensing means disposed with respect to said surface to receive reflections of said two component beams from said surface for determining the difference in Doppler shift frequency of portions of said two component beams to measure the rate of movement of said surface in said direction.

5. Apparatus as described in claim 4, wherein said component beams are in a plane intersecting the plane of said surface in a line parallel to the direction of motion of said surface.

6. Apparatus according to claim 4 wherein said two component beams are directed upon said surface at equal angles to the normal of the average plane of said surface to sense a velocity component parallel to the average plane of said surface.

7. Apparatus for measuring the rate of movement of a surface according to claim 6 with a further provision that the respective said reflecting means are each positioned to direct their respective component beams upon said surface at known angles to opposite sides of the normal to the average planes of said surface in a plane intersecting said surface plane in a line parallel to the direction of movement of said surface.

UNITED STATES PATENT OFFICE
CERTIFICATE OF CORRECTION

Patent No. 3,604,804     Dated September 14, 1971

Inventor(s) Carl M. Penney and Henry Hurwitz, Jr.

It is certified that error appears in the above-identified patent and that said Letters Patent are hereby corrected as shown below:

Column 1, line 10, after "electromagnetic" insert --or--.
Column 2, line 69, after "shifts." insert --It may readily be shown that this difference in Doppler shifts--. Column 4, line 6, cancel "$\frac{1}{\lambda}(\hat{e}_1-\hat{e}_2) \cdot \bar{V}$" and substitute --$\frac{1}{\lambda}(\hat{e}_s-\hat{e}_2) \cdot \bar{V}$--.
Column 5, line 74, cancel "θV x lλ" and substitute --θVx/λ --.
Column 6, line 64, after "of" insert --relative velocity, as for example, measurements of--. Column 7, line 1, after "invention" insert --is--.

Signed and sealed this 16th day of May 1972.

(SEAL)
Attest:

EDWARD M. FLETCHER, JR.
Attesting Officer

ROBERT GOTTSCHALK
Commissioner of Patents